UNITED STATES PATENT OFFICE.

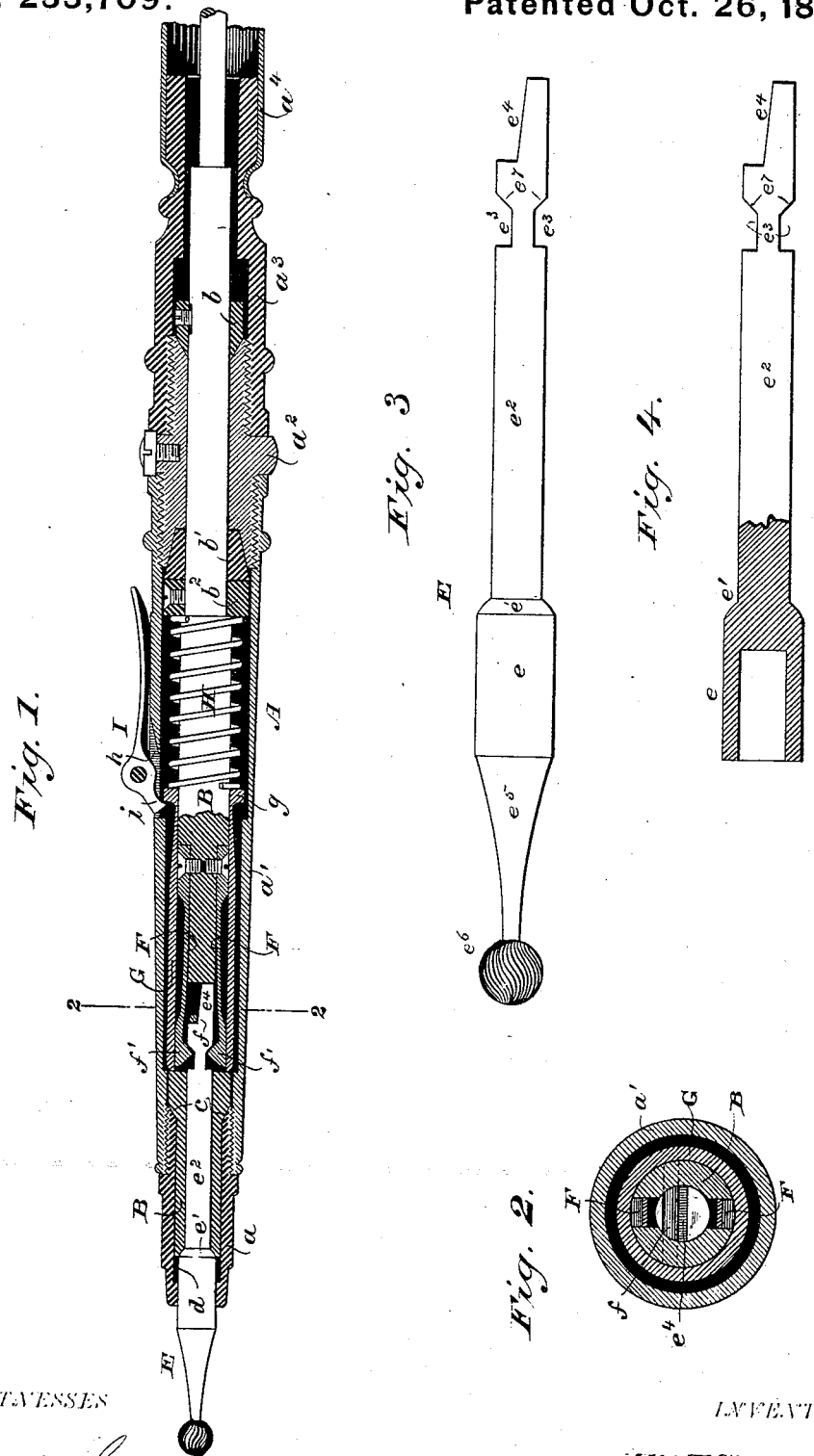

ELI T. STARR, OF PHILADELPHIA, PA., ASSIGNOR TO JAS. W. WHITE, J. CLARENCE WHITE, AND H. M. LEWIS, AS TRUSTEES, OF SAME PLACE.

DENTAL HAND-PIECE.

SPECIFICATION forming part of Letters Patent No. 233,709, dated October 26, 1880.

Application filed August 16, 1880. (Model.)

*To all whom it may concern:*

Be it known that I, ELI T. STARR, of the city and county of Philadelphia, in the State of Pennsylvania, have invented certain new and useful Improvements in Dental-Engine Hand-Pieces and Operating-Tools therefor, (Case I',) of which the following is a specification.

My present invention constitutes an improvement more especially upon the hand-piece and operating-tool, shown in my application for Letters Patent filed on the 29th day of July, 1880.

The object of my said invention is to provide an improved hand-piece in which all wear of the tool-holder and bearings may be readily compensated for or taken up by adjustment, and in which the operating-tool may be held and driven steadily and positively, avoiding all rattling movement or vibration between the tool and its rotating holder.

The subject-matter claimed is particularly pointed out at the close of the specification.

In the accompanying drawings, which show my improvements as organized in the best way now known to me, Figure 1 is a longitudinal central section through the hand-piece, showing an operating-tool as locked in the socket of the rotary tool-holder or chuck. Fig. 2 is a cross-section therethrough on the line 2 2 of Fig. 1, looking toward the front end of the hand-piece. Fig. 3 is a view, in elevation, of one of my improved operating-tools, and Fig. 4 is a view of a portion thereof, partly in section.

The casing A of the hand-piece is shown as constructed of five tubular sections in this example—that is to say, it consists of a front section or nose, $a$, (preferably of hardened steel,) which gives bearing to the front end of the spindle tool-holder or chuck B of a handle-section, $a'$, surrounding the tool-holder and forming a sheath for it, said section being held ordinarily between the fingers and thumb of the operator, (somewhat in the manner of holding a pen or pencil,) to guide and direct the operating-tool and hold it to its work; of a section, $a^2$, which is connected with the handle-section by screw-threads, so as to permit said handle-section to be removed in order to expose the tool-holder for oiling, cleansing, &c., said section $a^2$ affording the axial bearing for the rear end of the spindle tool-holder; of a section, $a^3$, connected with said bearing-section $a^2$ by screw-threads, so as to permit disconnection of said sections, in order to permit adjustment of a collar, $b$, on the rear end of the tool-holder or chuck, and of a shank-section, $a^4$, connected with the section $a^3$ by a swivel-joint, so as to permit the handle-section to be turned around the tool-holder relatively to the shank-section, in order to conform to the turning movements of the hand of the operator in manipulating the instrument.

The said shank-section $a^4$ of the casing A is connected with the outer or free end of a flexible sheath or tube, which surrounds a flexible driving-shaft or power-conveyer driven by any suitable motor and connected at its outer or free end with the butt-end of the spindle tool-holder B, whereby said tool-holder may be given a rapid revolving motion on its longitudinal axis in the bearings in the casing. Said flexible shaft and enveloping sheath or tube may be similar to those in common use—for instance, like those used with the well-known S. S. White dental engine, or as shown in Letters Patent heretofore granted to me September 2, 1879, and November 26, 1879, respectively numbered 219,320 and 222,093. Inasmuch, however, as neither the said shaft and sheath nor the particular organization of engine used constitute the subject-matter claimed by me herein, I have deemed it unnecessary to illustrate them in the drawings or describe them in detail.

The front end of the tool-holder or chuck is provided with an inclined or conical shoulder, $c$, fitting a similarly-formed seat in the rear end of the hard-metal nose or front section, $a$, of the casing, whereby the tool-holder is made to run smoothly, while wear is readily compensated for. Said tool-holder is also socketed, as usual, for the reception of the driving ends of the operating-tools. A collar or ring, $b$, having a tapering or cone end, is fitted upon the tool-holder shaft and locked by a set-screw, preferably, so as to fit with its cone end in a correspondingly-formed seat in the butt-end of the casing-section $a^2$. Said cone-collar constitutes the pull-bearing of the tool-holder—that is to say, it constitutes a bearing which prevents the endwise forward movement of the tool-holder in the casing when a pulling or draw cut is being made with the operating-tool. A tapering or cone friction-collar, $b'$, is fitted upon the tool-holder, so as to fit in a correspondingly-formed seat in the front end of the casing-section $a^2$, and is held firmly in its seat in said casing-section by an adjustable annular collar or ring, $b^2$, which is forced up against the annular shoulder formed by the front end of the cone-collar $b'$ and locked upon the shaft by a set-screw or similar device. Said cone-collar $b'$, in connection with ring $b^2$, constitutes the push or thrust bearing of the tool-holder—that is to say, it constitutes a bearing which prevents the endwise, backward, or inward movement of the tool-holder in the casing when a thrust or pushing cut is being made with the operating-tool.

Owing to the adjustability of the cone-collars $b\ b'$, any wear of the journals of the chuck or tool-holder, or of the bearings in the casing, may be readily taken up or compensated for, and thus smooth running of the tool-holder at all times be insured.

It will be noticed that an annular chamber, $d$, is formed between the front end of the spindle tool-holder B and the end of the casing through which the tool-shank is passed on its way to the tool-holder, and this chamber is for the purpose of arresting the passage into the front bearing and chuck-socket of saliva, grit, &c., taken up by the revolution of the tool, and, furthermore, to prevent the exudation of oil from said front bearing to the outside of the hand-piece, which would soil the fingers of the operator and face of the patient; but as this feature is the invention of Dr. T. S. Phillips, to whom a patent has been granted, it, of course, forms no part of the invention claimed by me.

The shank of the operating-tool E, adapted to my improved hand-piece, is provided with a straight cylindrical portion, $e$, terminating in rear in a rounded annular shoulder, $e'$, and with a reduced cylindrical portion, $e^2$, having a double locking transverse notch or recess, $e^3$, with which the tool-locking devices of the tool-holder engage, as will be presently explained. Said reduced cylindrical portion $e^2$ is also, at its extreme rear end, cut away or flattened, as at $e^4$, so as to have a flat or tapering driving-surface to be acted upon by a suitable lug, pin, or actuator, $f$, in the socket of the tool-holder. The portion $e^5$ of the tool-shank in front of the cylindrical portion $e$ is preferably reduced in size as compared with said cylindrical portion, and terminates at the extreme front end in a cutting-burr, drill, or other operating-point $e^6$, commonly employed for dental operations.

The locking transverse or cross notches in the driving end of the tool are peculiar. The notch is formed so that its rear wall, $e^7$, is inclined, tapering from the cylindrical surface of the shank in a forward direction, as clearly shown in the drawings, so that when acted upon by a laterally-moving tool-locking device the tool will be moved backward by reason of its inclined wall.

In practice I contemplate constructing the operating-tool either in a single piece, as usual, or in sections, one section consisting of the portions $e\ e^2$, and the other section of the operating-point $e^6$, with the short shank or extension $e^5$ fitting a socket in the front end of the cylindrical portion $e$, (see Fig. 4,) the two sections of the tool being rigidly united, for instance, by a transverse pin or rivet.

The cylindrical portion $e$ of the tool fits snugly the opening in the nose of the hand-piece, through which the shank is passed on its way to the tool-holder socket, while the rounded shoulder $e'$ fits snugly a cup-seat or enlarged mouth of said socket, as shown in Fig. 1.

The tool is positively driven, when inserted in the socket of the tool-holder, by the pin or lug $f$ crossing or extending into said socket and engaging the flattened driving-surface $e^4$ of the tool, while the tool is locked from endwise movement or withdrawal by the tool-locking devices, shown as consisting of two plate-springs, F F, fastened at their rear ends directly opposite each other in longitudinal recesses in the tool-holder, and having a tendency at their front ends to move outward or laterally when not compressed by a sleeve or thimble, G, surrounding the chuck, and movable endwise thereon.

The front ends of the laterally-movable locking-springs are provided each with a tapering or inclined lug, $f'$, projecting into a lateral opening intersecting the bore or socket of the tool-holder, and each lug comes in contact, when compressed, with one of the inclined walls of the locking-notches of the tool-shank, and thereby, as the lug is forced down into the notch, forces the tool backward and draws its rounded shoulder firmly into its seat in the mouth of the tool-holder socket, whereby the tool is not only firmly locked from withdrawal, but is also prevented from wabbling or rattling in the socket. Any wear that may occur between the tool and socket is also compensated for, and the tool always driven firmly and without rattling or loose movement.

The sleeve G is thrust forward to compress the lug-nosed tool-locking ends of the springs F F by means of a coiled spring, H, also surrounding the tool-holder, and compressed between the fixed collar $b^2$ at rear and the annular shoulder formed by the butt-end of the sleeve at front, the force of said spring H being exerted at all times to thrust the sleeve forward to compress the laterally-yielding locking devices into engagement with the notches of the tool-shank, as clearly shown in Fig. 1.

When a tool has been inserted and locked in the socket and it is desired to withdraw it, the sleeve G is retracted against the force of the spring H, so as to permit the locking ends of the springs F F to spring outward, which operation releases the tool and enables it to be withdrawn. This retraction of the sleeve I preferably accomplish by means of a lever or finger-piece, I, pivoted between suitable lugs on the exterior of the casing, the front end of the lever being provided with a lip or extended end, *i*, which works through an opening, *h*, in the side of the casing, and engages, when the rear end of the lever is raised, with an annular shoulder, *g*, on the sleeve, to retract it as the lip *i* of the lever moves backward around the pivot of the lever. The lever, when not raised to manipulate the tool-locking devices, lies closely down upon the casing, Fig. 1, so that its lip remains out of the way of the sleeve G, and does not interfere with the turning movements of said sleeve with the tool-holder when the tool is at work.

It will be noticed that the lever I, which actuates the tool-locking devices, is raised in a forward direction and moves the controlling-sleeve backward to permit the tool-locking devices to move laterally to release the tool, which organization enables the thumb or finger of the hand that holds the hand-piece to be used to work the lever, leaving the other hand of the operator disengaged and free to remove or insert the tool.

It will also be noticed that the lever is so organized as not to interfere with the ready removal of the handle-section of the casing in order to expose the chuck-bearings for oiling, &c.

I have described the operating-tool as having a shoulder and a double locking-notch with tapering walls to be acted upon by two locking devices from opposite sides, and this construction I prefer; but it will be obvious that only one such notch and a single locking device to act upon its inclined wall would serve an excellent purpose with the shouldered tool, and would not be a departure from my invention.

I disclaim herein in favor of my application filed July 29, 1880, all patentable subject-matter common to the two cases, except so far as concerns, first, an operating-tool having a shoulder to determine its extent of movement into a tool-holder socket and a locking-notch at its driving end having a tapering rear wall, and, second, a hand-piece having a socketed spindle tool-holder provided with an enlarged mouth or seat for the reception of a shoulder on the shank of an operating-tool, and a tool-locking device movable laterally only, provided with a tapering lug to engage the tool-shank and lock it in the socket of said tool-holder while drawing the shoulder of the tool firmly in its seat in the tool-holder. Such a tool and hand-piece are intended to be covered in this present application.

I claim herein as my invention—

1. The combination, substantially as hereinbefore set forth, of the casing, the socketed spindle tool-holder having a seat or enlarged mouth for the reception of a shoulder on the shank of an operating-tool, and a tool-locking device movable laterally only, having a tapering lug or end to engage the tool-shank and lock it in the socket of said tool-holder while drawing the shoulder of the tool firmly in its seat in the tool-holder.

2. The combination, substantially as hereinbefore set forth, of the casing, the socketed spindle tool-holder having a seat or enlarged mouth for the reception of a shoulder on the shank of an operating-tool, the laterally-movable tool-locking devices upon opposite sides of the tool-holder, having tapering lugs to engage locking-notches in the tool-shank to lock said shank in the socket of the tool-holder and force its shoulder in its seat in said socket, the sliding sleeve to compress said tool-locking devices, the spring acting upon said sleeve to throw it forward, and the lever on the casing to retract said sleeve.

3. An improved operating-tool constructed, substantially as hereinbefore set forth, with a shoulder to determine its extent of movement into a tool-holder socket, and with a locking-notch at its driving end having a tapering rear wall to be acted upon by tool-locking devices.

4. The improved operating-tool constructed, substantially as hereinbefore set forth, with a cylindrical portion terminating at rear in an annular shoulder, and with a reduced cylindrical shank having a flattened driving end, and a double transverse locking-notch with inclined rear walls sloping downward toward the front end of the tool.

In testimony whereof I have hereunto subscribed my name this 14th day of August, A. D. 1880.

ELI T. STARR.

Witnesses:
WM. J. PEYTON,
JAMES YOUNG.